United States Patent
Seo et al.

(10) Patent No.: US 12,176,732 B2
(45) Date of Patent: Dec. 24, 2024

(54) WIRELESS POWER CHARGING METHOD AND ELECTRONIC DEVICE USING SAME

(71) Applicant: SAMSUNG ELECTRONICS CO., LTD., Suwon-si (KR)

(72) Inventors: Hyundeok Seo, Suwon-si (KR); Byunghwa Park, Suwon-si (KR); Kyungmin Park, Suwon-si (KR); Juhyang Lee, Suwon-si (KR); Hyunho Lee, Suwon-si (KR); Byungyeol Choi, Suwon-si (KR); Yusu Kim, Suwon-si (KR); Chihyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 728 days.

(21) Appl. No.: 17/428,908

(22) PCT Filed: Jan. 23, 2020

(86) PCT No.: PCT/KR2020/001183
§ 371 (c)(1),
(2) Date: Aug. 5, 2021

(87) PCT Pub. No.: WO2020/171402
PCT Pub. Date: Aug. 27, 2020

(65) Prior Publication Data
US 2022/0077722 A1  Mar. 10, 2022

(30) Foreign Application Priority Data

Feb. 19, 2019 (KR) .................. 10-2019-0019025

(51) Int. Cl.
*H02J 50/80* (2016.01)
*H02J 7/00* (2006.01)
(Continued)

(52) U.S. Cl.
CPC ............ *H02J 50/80* (2016.02); *H02J 7/0049* (2020.01); *H02J 7/005* (2020.01);
(Continued)

(58) Field of Classification Search
CPC ...................................................... H02J 50/80
(Continued)

(56) References Cited

U.S. PATENT DOCUMENTS

2014/0361728 A1* 12/2014 Qian ................... H02J 50/80
                                                        320/106
2015/0358912 A1  12/2015 Tsukamoto
(Continued)

FOREIGN PATENT DOCUMENTS

JP   2012-039682    2/2012
JP   2015-226396    12/2015
(Continued)

OTHER PUBLICATIONS

Office Action dated Nov. 23, 2023 in Korean Application No. 10-2019-0019025 and English-language translation.
(Continued)

*Primary Examiner* — Eric D Lee
(74) *Attorney, Agent, or Firm* — Nixon & Vanderhye, P.C.

(57) ABSTRACT

An electronic device may comprise: a battery; a charging circuit; a wireless power receiver circuit configured to acquire transmitted power wirelessly output from an external electronic device; and a processor. The processor may be configured to control the electronic device to: charge the battery through the charging circuit using received power acquired through the wireless power receiver circuit; identify at least one piece of information related to the charging, while the charging operation is performed; transmit a designated signal corresponding to suspension of the transmit-
(Continued)

ted power to the external electronic device such that the external electronic device enters a wireless charging standby mode, in which the external electronic device holds the operation of outputting the transmitted power, at least partially based on the at least one piece of information; identify first situation information regarding the electronic device during the wireless charging standby mode; identify second situation information regarding the electronic device, in response to identifying the first situation information; and sense the electronic device being detached from the external electronic device based on the electronic device corresponding to the first situation information and the second situation information.

4 Claims, 8 Drawing Sheets

(51) Int. Cl.
    *H02J 50/10*         (2016.01)
    *H02J 50/90*         (2016.01)
    *H04B 5/79*          (2024.01)

(52) U.S. Cl.
    CPC .......... *H02J 7/00712* (2020.01); *H02J 50/10* (2016.02); *H02J 50/90* (2016.02); *H04B 5/79* (2024.01)

(58) Field of Classification Search
    USPC ........................................................ 320/108
    See application file for complete search history.

(56) References Cited

U.S. PATENT DOCUMENTS

| | | |
|---|---|---|
| 2015/0380973 A1 | 12/2015 | Scheb |
| 2016/0204642 A1 | 7/2016 | Oh et al. |
| 2017/0214434 A1 | 7/2017 | Hong |
| 2017/0353054 A1 | 12/2017 | Lee |
| 2018/0062422 A1 | 3/2018 | Kim et al. |
| 2019/0013698 A1* | 1/2019 | Shichino .................. H04B 5/79 |
| 2020/0076248 A1* | 3/2020 | Ye .......................... H02J 50/10 |
| 2021/0399591 A1 | 12/2021 | Kim et al. |

FOREIGN PATENT DOCUMENTS

| | | |
|---|---|---|
| JP | 2016-010070 | 1/2016 |
| JP | 6163133 | 6/2017 |
| JP | 2019-017137 | 1/2019 |
| KR | 10-2014-0000444 U | 1/2014 |
| KR | 10-2016-0059395 | 5/2016 |
| KR | 10-2016-0111639 | 9/2016 |
| KR | 10-2017-0087754 | 7/2017 |
| KR | 10-2018-0024786 | 3/2018 |
| KR | 10-1900313 | 9/2018 |
| KR | 10-2018-0128704 | 12/2018 |
| KR | 10-2020-0047061 | 5/2020 |

OTHER PUBLICATIONS

International Search Report for PCT/KR2020/001183 dated May 7, 2020, 5 pages.
Written Opinion of the ISA for PCT/KR2020/001183 dated May 7, 2020, 5 pages.

* cited by examiner

WIRELESS POWER CHARGING METHOD AND ELECTRONIC DEVICE USING SAME

CROSS-REFERENCE TO RELATED APPLICATIONS

This application is a national stage of International Application No. PCT/KR2020/001183 designating the United States, filed on Jan. 23, 2020 in the Korean Intellectual Property Receiving Office and claiming priority to Korean Patent Application No. 10-2019-0019025, filed on Feb. 19, 2019, in the Korean Intellectual Property Office, the disclosures of which are incorporated by reference herein in their entireties.

BACKGROUND

Field

The disclosure relates to a wireless power charging method and an electronic device using the same.

Description of Related Art

An electronic device may be charged in a wireless or contactless manner by using a wireless power transfer technology. The wireless power transfer technology may refer to a technology for wirelessly transferring power from a power transmitting device to a power receiving device with no connection by a separate connector between the same, thereby charging the battery of the power receiving device. Wireless power transfer technologies may include a magnetic induction type and a magnetic resonance type, and may also include other wireless power transfer technologies in various types.

A situation may occur while the battery of an electronic device is charged through a power transmitting device, thereby making the ongoing wireless charging operation unnecessary or even dangerous (for example, the battery is fully charged, or the electronic device is deemed in an abnormal condition). The power transmitting device may still output power in such a situation. As a result, the battery of the electronic device may be continuously charged in a situation which requires no wireless charging operation, or which is dangerous.

In such a case, the electronic device may enter a wireless charging standby mode. The electronic device may control and deactivate the power receiving circuit such that wirelessly charging is temporarily stopped. In the wireless charging standby mode, in which the power receiving circuit is deactivated, the electronic device may be unable to receive a ping signal from the power transmitting device. Accordingly, the electronic device may have a separate attachment/detachment sensing circuit so as to receive a ping signal from the power transmitting device, may identify the charging state, abnormal state, attachment/detachment state, or the like of the electronic device in response to receiving a ping signal, and may reactivate the power receiving circuit.

However, the attachment/detachment sensing circuit is a hardware component and, if the same is not provided, or if the same has an error and does not function correctly, it may be difficult to instantly identify the charging state, abnormal state, attachment/detachment state, or the like of the electronic device. For example, if an electronic device having no attachment/detachment sensing circuit is detached from the power transmitting device in the wireless charging standby mode, a situation may occur, in which no ping signal can be sensed from the power transmitting device, because the power receiving device is deactivated. In this case, the electronic device may remain in the wireless charging standby mode as if being cradled on the power transmitting device, and may continuously indicate, through the display, that wireless charging is going on. Such an experience may consequently result in consumer dissatisfaction.

SUMMARY

An electronic device according to various example embodiments of the disclosure may include: a battery; a charging circuit; a wireless power reception circuit configured to acquire transmission power wirelessly output from an external electronic device; and a processor, wherein the processor is configured to control the electronic device to: charge the battery through the charging circuit using received power acquired through the wireless power reception circuit; determine at least one piece of information related to the charging while the charging is performed; transmit, based at least partially on the at least one piece of information, a designated signal corresponding to stopping of the transmission power to the external electronic device such that the external electronic device enters a wireless charging standby mode in which the external electronic device holds outputting the transmission power; determine first situation information about the electronic device during the wireless charging standby mode; determine second situation information about the electronic device in response to the determining of the first situation information; and based on the electronic device corresponding to the first situation information and the second situation information, sense that the electronic device is detached from the external electronic device.

A method of operating an electronic device according to various example embodiments of the disclosure may include: charging a battery through a charging circuit using received power acquired through a wireless power reception circuit; determining at least one piece of information related to the charging while the charging is performed; transmitting, based at least partially on the at least one piece of information, a designated signal corresponding to stopping of the transmission power to an external electronic device such that the external electronic device enters a wireless charging standby mode in which the external electronic device holds outputting the transmission power; determining first situation information about the electronic device during the wireless charging standby mode; determining second situation information about the electronic device in response to the determining of the first situation information; and based on the electronic device corresponding to the first situation information and the second situation information, sensing that the electronic device has been detached from the external electronic device.

According to various example embodiments of the disclosure, an electronic device (for example, a power receiving device) may include a software module for sensing attachment/detachment in connection with performing a wireless charging operation with an external electronic device (for example, a power transmitting device). This may address the situation that, even if the electronic device has no attachment/detachment sensing circuit, or if the provided attachment/detachment sensing circuit has an error and does not function correctly, attachment/detachment between the electronic device and the external electronic device can be quickly identified. The wireless charging standby mode can be utilized based on the attachment/detachment sensing module of the electronic device, and wireless charging can thus be performed more efficiently.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
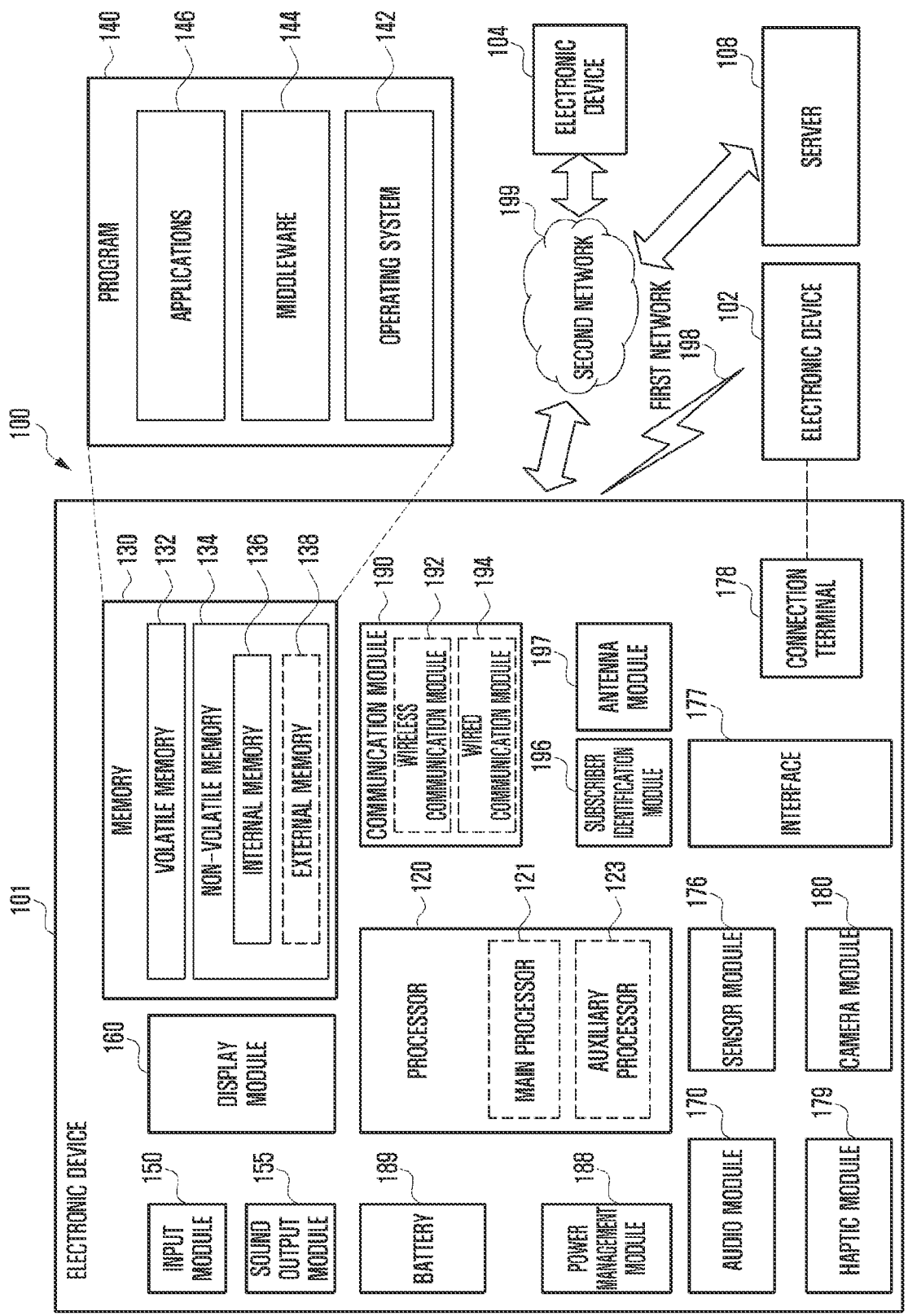
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
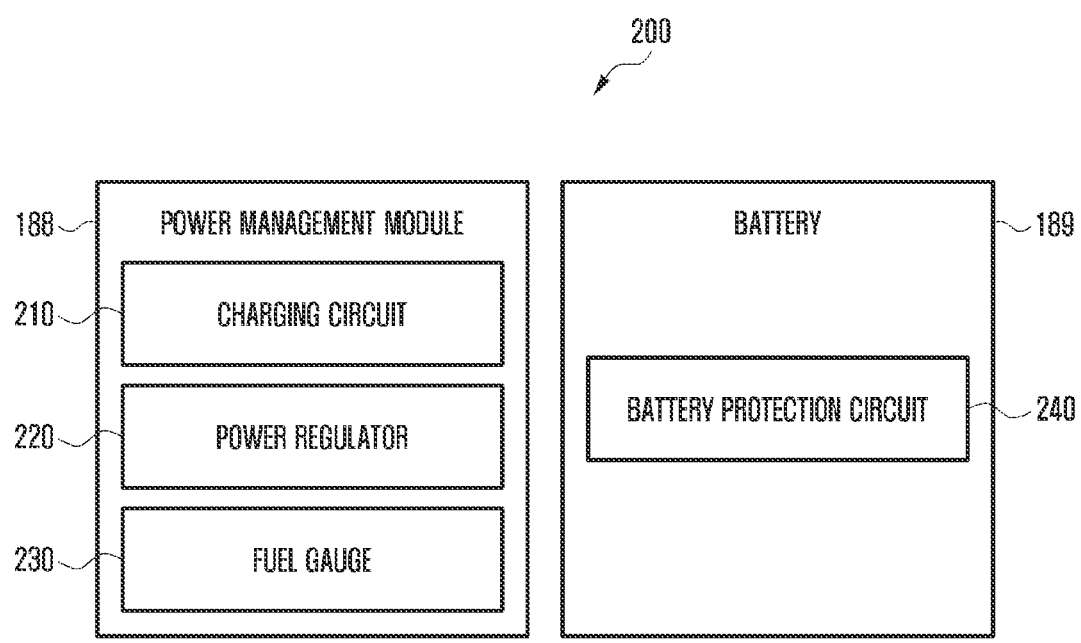
FIG. 2 is a block diagram illustrating an example configuration of a power management module and a battery according to various embodiments.

FIG. 2 is a block diagram 200 illustrating an example configuration of the power management module 188 and the battery 189 according to various embodiments.

Referring to FIG. 2, the power management module 188 may include a charging circuit 210, a power regulator 220, or a fuel gauge 230. The charging circuit 210 may charge the battery 189 using power supplied from an external power supply to the electronic device 101. According to an embodiment, the charging circuit 210 may select a charging method (e.g., normal charging or fast charging) based on at least some of the type of external power supply (e.g., a power supply adapter, USB, or wireless charging), the magnitude of power capable of being supplied from the external power supply (e.g., about 20 W or more), or the attributes of the battery 189, and may charge the battery 189 using the selected charging method. The external power supply, for example, may be wiredly connected through the connection terminal 178, or may be wirelessly connected through the antenna module 197.

The power regulator 220 may include various circuitry and regulate the voltage level or current level of power supplied from an external power supply or the battery 189, thereby generating multiple types of power having different voltage levels or different current levels. The power regulator 220 may regulate power from the external power supply or the battery 189 into a voltage or current level suitable for each of elements included in the electronic device 101. According to an embodiment, the power regulator 220 may be implemented, for example, and without limitation, as a low-dropout (LDO) regulator, a switching regulator, or the like.

The fuel gauge 230 may include various circuitry and measure usage state information of the battery 189 (e.g., the capacity of the battery, the number of times the battery is charged/discharged, the voltage of the battery, or the temperature of the battery, etc.).

The power management module 188 may use, for example, the charging circuit 210, the power regulator 220, or the fuel gauge 230 to: determine, based on at least a part of the measured usage state information, charging state information related to charging of the battery 189 (e.g., lifespan, overvoltage, low voltage, overcurrent, overcharging, over-discharge, overheating, short circuit, or swelling); determine, based on at least a part of the determined charging state information, whether the battery 189 is normal or abnormal; when it is determined that the battery 189 is abnormal, regulate the charging of the battery 189 (e.g., reduce a charging current or voltage or stop charging). According to an embodiment, at least some of functions of the power management module 188 may be performed by an external control device (e.g., the processor 120).

According to an embodiment, the battery 189 may include a battery protection circuit (protection circuit module (PCM)) 240. The battery protection circuit 240 may perform various functions (e.g., pre-blocking functions) for preventing and/or reducing the performance reduction of the battery 189 or damage to the battery 189 by a fire. Additionally or in alternative thereto, the battery protection circuit 240 may be formed as at least a part of a battery management system (BMS) for performing cell balancing, battery capacity measurement, measurement of the number of times of battery charging/discharging, battery temperature measurement, or battery voltage measurement.

According to an embodiment, the usage state information and the charging state information of the battery 189 may be at least partially measured using the fuel gauge 230, the power management module 188, or a pertinent sensor (e.g., a temperature sensor) of a sensor module 276. According to an embodiment, the pertinent sensor (e.g., a temperature sensor) of a sensor module 276 may be included as a part of the battery protection circuit 140, or may be disposed as a device separate therefrom near the battery 189.

Each of the elements described in the disclosure may include one or more components, and the names of the corresponding elements may vary depending on the type of electronic device. In various embodiments, the electronic device may include at least one of the elements disclosed herein. Some of the elements may be omitted from or other additional elements may be further included in the electronic device. Some of the elements of the electronic device according to various embodiments may be combined into one entity, which may perform functions identical to those of the relevant elements before the combination.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via another element (e.g., third element).

As used herein, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and some of the above-described sub elements may be omitted, or other sub elements may be added in various embodiments. Alternatively or additionally, some elements (e.g., modules or programs) may be integrated into a single element. In such a case, the integrated element may still perform functions of each of the elements in the same or similar manner as they are performed by a corresponding one of the elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Figure 3:
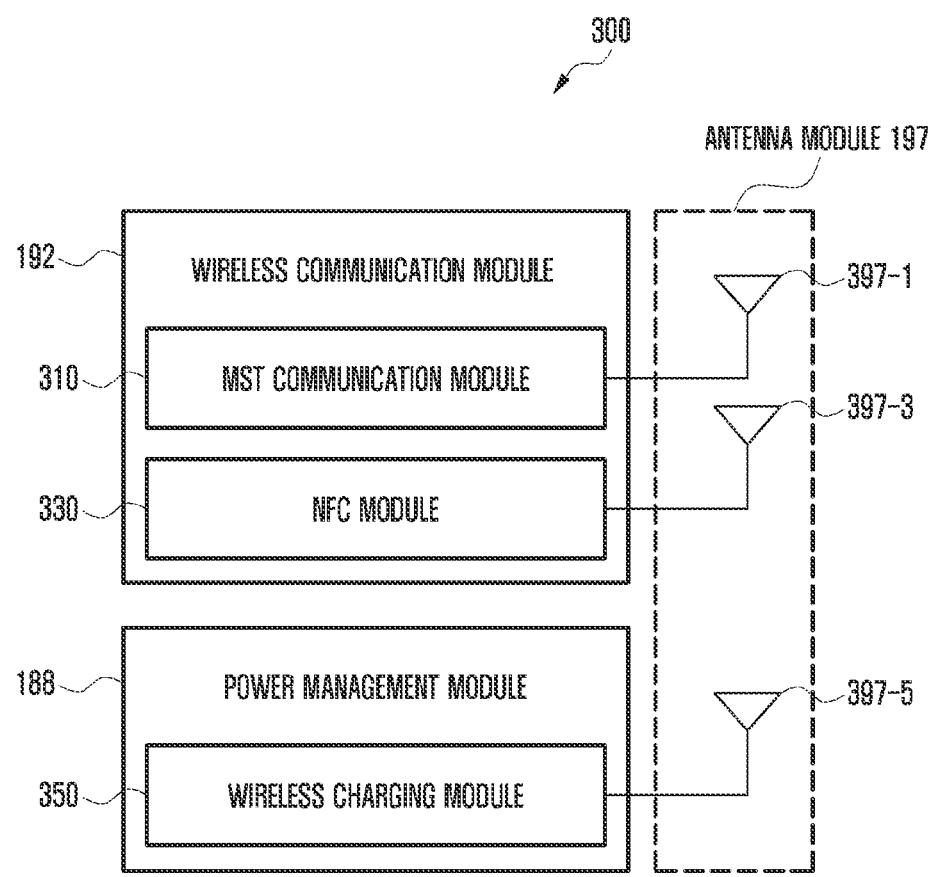
FIG. 3 is a block diagram illustrating an example configuration of a wireless communication module, a power management module, and an antenna module of an electronic device according to various embodiments.

FIG. 3 is a block diagram illustrating an example configuration of a wireless communication module, a power management module, and an antenna module of an electronic device according to various embodiments.

Referring to FIG. 3, the wireless communication module 192 may include various communication circuitry included in various modules, such as, for example, and without limitation, an MST communication module 310 and/or an NFC module 330, and the power management module 188 may include a wireless charging module (e.g., including wireless charging circuitry) 350. The antenna module 197 may include multiple antennas which includes an MST antenna 397-1 connected to the MST communication module 310, an NFC antenna 397-3 connected to the NFC module 330, and a wireless charging antenna 397-5 connected to the wireless charging module 350. For ease in description, elements overlapping those in FIG. 1 may not be fully repeated here.

According to various embodiments, the MST communication module 310 may include various MST communication circuitry and receive a signal including control information or payment information such as card information from the processor 120, may generate a magnetic signal corresponding to the received signal through the MST antenna 397-1, and may transfer the generated magnetic signal to an external electronic device 102 (e.g., a POS device). In order to generate the magnetic signal, according to an embodiment, the MST communication module 310 may include a switching module (not shown) including one or more switches connected to the MST antenna 397-1, and may control the switching module to change, based on the received signal, the direction of a voltage or current supplied to the MST antenna 397-1. The change in the direction of the voltage or current allows the direction of a magnetic signal (e.g., the magnetic field) transmitted through the MST antenna 397-1 to change accordingly. When the magnetic signal having a changed direction is sensed by the external electronic device 102, the magnetic signal may cause an effect (e.g., waveform) similar to that of a magnetic field generated while a magnetic card corresponding to the received signal (e.g., card information) is swiped through a card reader of the electronic device 102. According to an embodiment, the payment-related information or the control information received in the form of the magnetic signal in the electronic device 102 may be transmitted to, for example, the external server 108 (e.g., a payment server) through the network 199.

According to various embodiments, the NFC module 330 may include various NFC communication circuitry and acquire a signal including control information or payment information such as card information from the processor 120, and may transmit the acquired signal to the external electronic device 102 through the NFC antenna 397-3. According to an embodiment, the NFC module 330 may receive, through the NFC antenna 397-3, a signal transmitted from the external electronic device 102.

According to various embodiments, the wireless charging module 350 may include various wireless charging circuitry and wirelessly transmit power to the external electronic device 102 (e.g., a portable phone or a wearable device) through the wireless charging antenna 397-5, or may wirelessly receive power from the external electronic device 102 (e.g., a wireless charging device). The wireless charging module 350 may support at least one of various wireless charging methods including, for example, a magnetic resonance method or a magnetic induction method.

According to various embodiments, some antennas of the MST antenna 397-1, the NFC antenna 397-3, or the wireless charging antenna 397-5 may at least partially share a radiation part. For example, a radiation part of the MST antenna 397-1 may be used as a radiation part of the NFC antenna 397-3 or the wireless charging antenna 397-5, and vice versa. The antenna module 197 may include a switching circuit (not shown) configured to selectively connect (e.g., close) or separate (e.g., open) at least some of the antennas 397-1, 397-3, or 397-3 according to control of the wireless communication module 192 (e.g., the MST communication module 310 or the NFC module 330) or the power management module 188 (e.g., the wireless charging module 350). For example, when the electronic device 101 uses a wireless charging function, the NFC module 330 or the wireless charging module 350 may control the switching circuit to temporarily separate at least a partial region of a radiation part shared by the NFC antenna 397-3 and the wireless charging antenna 397-5 from the NFC antenna 397-3 and connect the same to the wireless charging antenna 397-5.

According to various embodiments, at least one function of the MST communication module 310, the NFC module 330, or the wireless charging module 350 may be controlled by an external processor (e.g., the processor 120). According to an embodiment, designated functions (e.g., a payment function) of the MST communication module 310 or the NFC module 330 may be performed in a trusted execution environment (TEE). The trusted execution environment (TEE) according to various embodiments may form an execution environment in which at least a partial designated region of the memory 130 is allocated in order to be used to perform, for example, a function requiring relatively high-level security (e.g., a function related to financial transactions or personal information). Access to the designated region may be separately and restrictively allowed depending on, for example, a subject having access thereto or an application executed in the trusted execution environment.

According to various embodiments, the wireless communication module 192 may communicate with an external electronic device through the MST antenna 397-1 or the NFC antenna 397-3 using a frequency band different from a frequency used for power transfer. In an embodiment, the wireless charging module 350 may communicate with an external electronic device through the wireless charging antenna 397-5 using a frequency band identical or adjacent to a frequency used for power transfer.

Figure 4A:
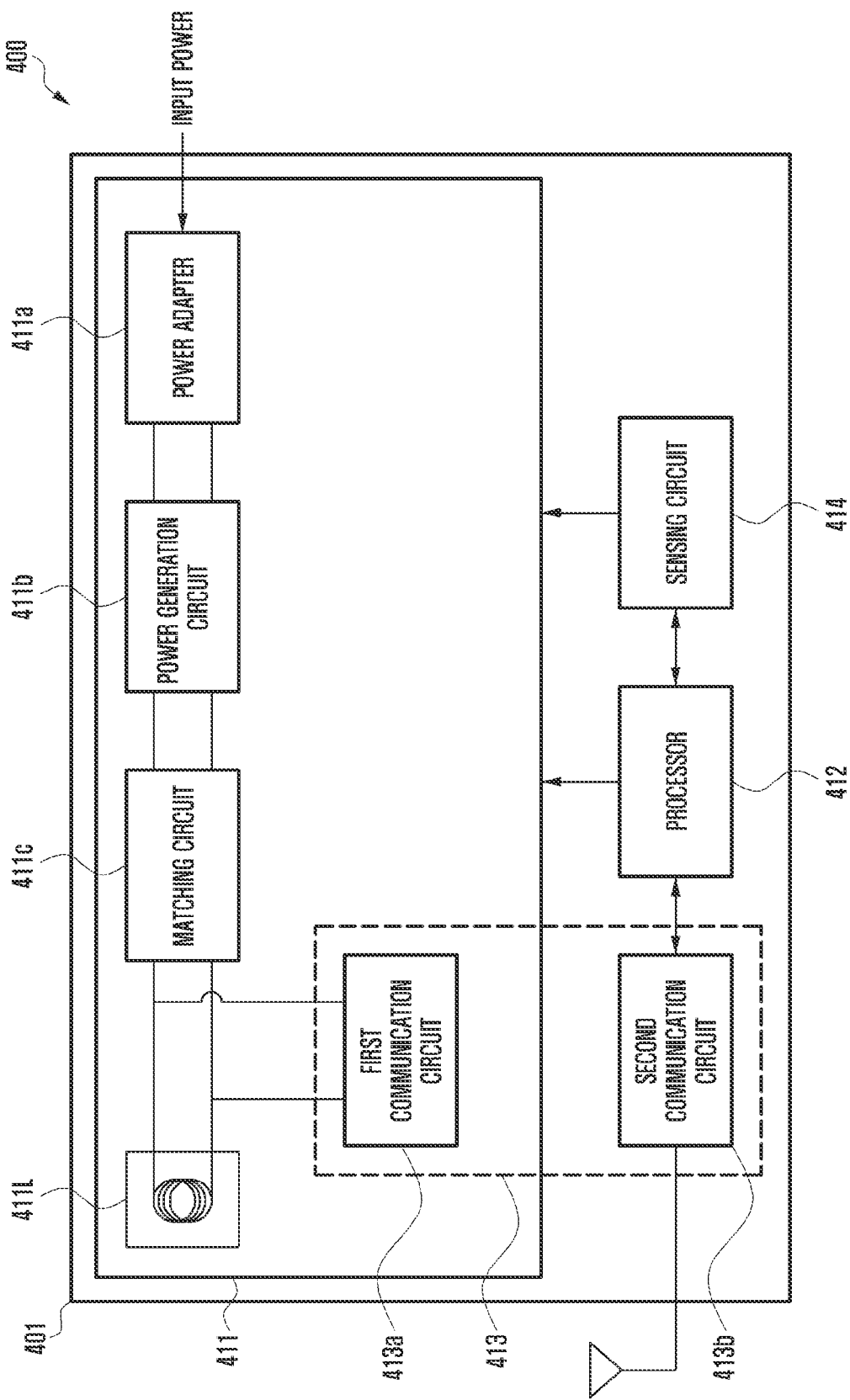
FIG. 4A is a block diagram illustrating an example configuration of an external electronic device according to various embodiments.

FIG. 4A is a block diagram 400 illustrating an example configuration of an external electronic device according to various embodiments.

Figure 4B:
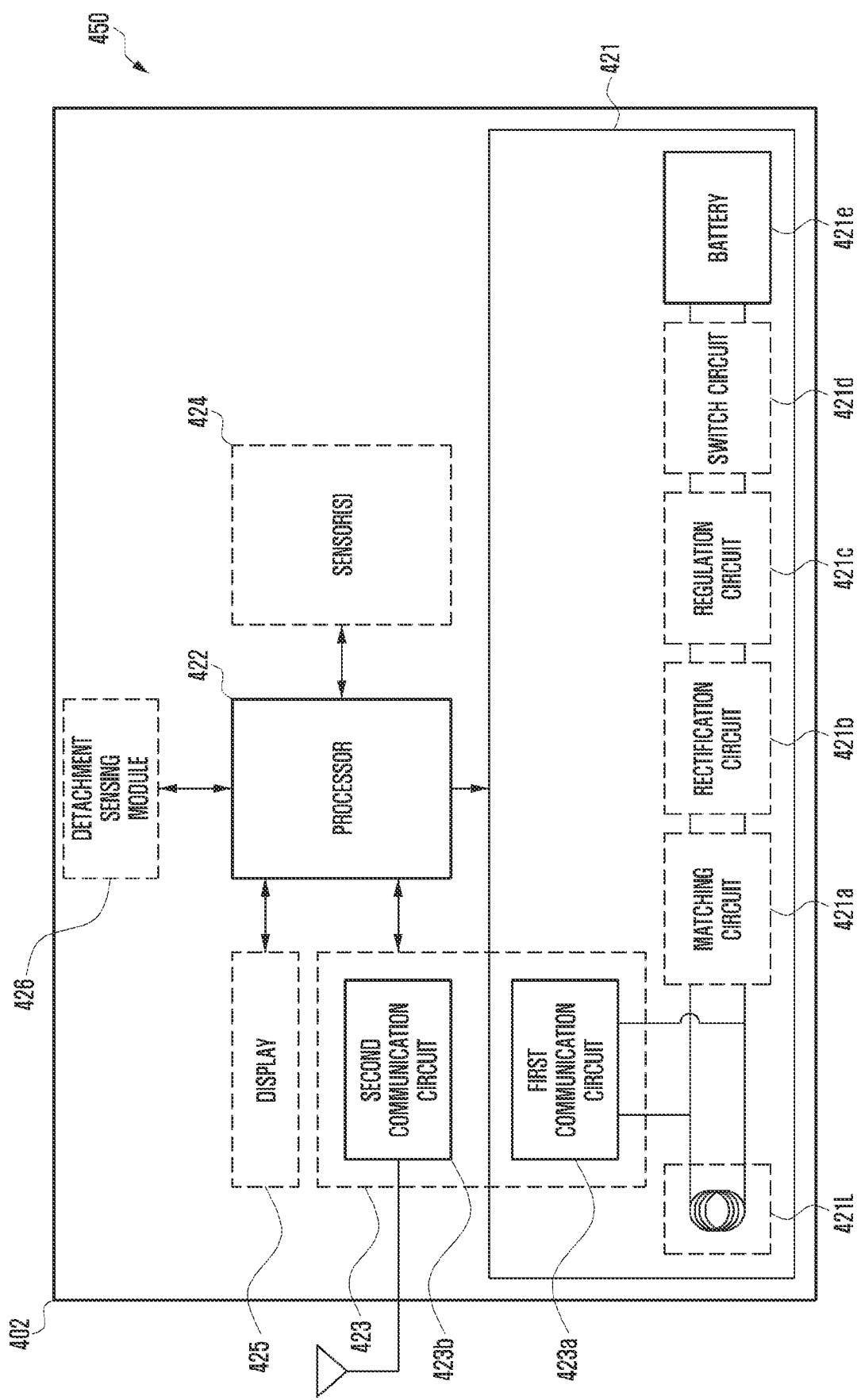
FIG. 4B is a block diagram illustrating an example configuration of an electronic device according to various embodiments.

FIG. 4B is a block diagram 450 illustrating an example configuration of an electronic device according to various embodiments.

According to various embodiments, referring to FIGS. 4A and 4B, an external electronic device 401 (e.g., the electronic device 102 in FIG. 1) (hereinafter, also referred to as a power transmission device) may supply power to an electronic device 402 (e.g., the electronic device 101 in FIG. 1) (hereinafter, also referred to as a power reception or power receiving device) in a wireless manner, and the electronic device 402 may receive power in a wireless manner. Roles of the external electronic device 401 and the electronic device 402 in a wireless charging function are not limited to FIGS. 4A and 4B, and may be applied in a reverse manner. For example, the external electronic device 401 (e.g., a smart phone) may function as a power reception device, and the electronic device 402 (e.g., a smart phone) may function as a power transmission device.

According to various embodiments, the power transmission device 401 may include a power transmission circuit 411, a processor (e.g., including processing circuitry) 412, a communication circuit 413, and/or the sensing circuit 414.

According to various embodiments, the power transmission circuit 411 may include a power adapter (e.g., including power adapter circuitry) 411a configured to receive power (or electric power) input from the outside and appropriately convert the voltage of the input power source, a power generation circuit 411b configured to generate power, and/or a matching circuit 411c configured to maximize and/or increase the efficiency between a transmission coil 411L and a reception coil 421L.

According to various embodiments, the power transmission circuit 411 may include a plurality of at least some of the power adapter 411a, the power generation circuit 411b, the transmission coil 411L, and/or the matching circuit 411c such that power can be transmitted to multiple power reception devices (for example, a first external electronic device and a second external electronic device).

According to various embodiments, the power transmission circuit 411 may use the power generation circuit 411b to generate a first signal, which has a first frequency, for providing first power to the first external electronic device and a second signal, which has a second frequency, for providing second power to the second external electronic device.

According to various embodiments, the processor 412 may include various processing circuitry and perform overall control of the power transmission device 401, may generate various messages necessary for wireless power transmission, and may transfer the messages to the communication circuit 413.

According to various embodiments, the processor 412 may calculate, based on information received from the communication circuit 413, power (or the amount of power) to be transmitted to the power reception device 402.

According to various embodiments, the processor 412 may control the power transmission circuit 411 such that the calculated power is transmitted to the power reception device 402 through the transmission coil 411L.

According to various embodiments, when power is transmitted to each of the multiple power reception devices (for example, the first external electronic device and the second external electronic device), the processor 412 may control the power generation circuit 411b to generate the first signal, which has the first frequency, for providing the first power to the first external electronic device and the second signal, which has the second frequency, for providing the second power to the second external electronic device.

According to various embodiments, the communication circuit 413 may include at least one of a first communication circuit 413a and/or a second communication circuit 413b. The first communication circuit 413a, for example, may communicate with a first communication circuit 423a of the power reception device 402 using a frequency band that is identical or adjacent to a frequency used for power transfer in the transmission coil 411L (e.g., an inband method). The first communication circuit 423a, for example, may perform communication using the transmission coil 411L for transferring power generated by the power generation circuit 411b to the electronic device 402.

According to various embodiments, the second communication circuit 413b, for example, may communicate with a second communication circuit 423b of the power reception device 402 using a frequency band different from a frequency used for power transfer in the transmission coil 411L (e.g., an outband method). For example, the second communication circuit 413b may use one of various short-range communication methods such as Bluetooth, BLE, wi-fi, and NFC. The processor 412 may acquire charged-state-related information (e.g., Vrec information, Iout information, various types of packets, messages, etc.) from the communication circuit 413, 413a, or 413b. The processor 412 may adjust, based on the charged-state-related information, power to be supplied to the power reception device 402.

According to various embodiments, the sensing circuit 414 may include at least one sensor, and may sense at least one state of the power transmission device 401 using the at least one sensor.

According to various embodiments, the sensing circuit 414 may include, for example, and without limitation, at least one among a temperature sensor, a motion sensor, a current (or voltage) sensor, or the like. The sensing circuit 414 may sense the temperature state of the power transmission device 401 using the temperature sensor, may sense the movement state of the power transmission device 401 using the motion sensor, and may sense the state of an output signal of the power transmission device 401, for example, a current magnitude, a voltage magnitude, or a power magnitude, using the current (or voltage) sensor.

According to various embodiments, the current (or voltage) sensor may measure a signal in the power transmission circuit 411. The current (or voltage) sensor may measure a signal in at least a partial region of each of the coil 411L, the matching circuit 411c, or the power generation circuit 411b. For example, the current (or voltage) sensor may include a circuit configured to measure a signal at the front end of the coil 411L.

According to various embodiments, the sensing circuit 414 may include a circuit for foreign object detection (FOD).

According to various embodiments, the processor 412 may transmit power for charging the battery 421e to the power reception device 402.

According to various embodiments, when a signal corresponding to power output stopping is received from the power reception device 402 such that an operation of wirelessly outputting power is stopped, the processor 412 may stop the operation of outputting power, based at least on situation information related to an operation of charging the battery 421e.

According to various embodiments, the processor 412 may receive, from the power reception device 402, a signal corresponding to power output resumption so as to resume the operation of wirelessly outputting power. In response to the reception of the signal corresponding to the power output resumption, the processor 412 may wirelessly output power and transmit the power to the power reception device 402.

According to various embodiments, when a response signal responding to a determination signal for determining the power reception device 402 is not received within a determined number of times, the processor 412 may control the power transmission device 401 to be in a default state.

According to various embodiments, the operation of controlling the power transmission device to be in the default state may include an operation of resetting which allows the stopped power output to be performed again.

According to various embodiments, the power reception device 402 (e.g., the electronic device 101 in FIG. 1) may include a power reception circuit 421, a processor 422 (e.g., the processor 120 in FIG. 1), a communication circuit 423 (e.g., the communication module 190 in FIG. 1), at least one sensor 424 (e.g., the sensor module 176 in FIG. 1), a display 425 (e.g., the display device 160 in FIG. 1), and/or a detachment sensing module (e.g., including detachment sensing circuitry) 426. In the power reception device 402, a description of an element corresponding to the power transmission device 401 may be partially omitted.

According to various embodiments, the power reception circuit 421 may include a reception coil 421L configured to wirelessly receive power from the power transmission device 401, a matching circuit 421a, a rectification circuit 421b configured to rectify received AC power to DC, a regulation circuit 421c configured to regulate a charging voltage, a switch circuit 421d, and/or a battery 421e (e.g., the battery 189 in FIG. 1). For example, the power reception circuit 421 may be included in a receiver integrated circuit (RxIC).

According to various embodiments, the communication circuit 423 may include at least one of the first communication circuit 423a and the second communication circuit 423b. The first communication circuit 423a may communicate with the power transmission device 401 through the reception coil 421L. The second communication circuit 423b may communicate with the power transmission device 401 using one of various short-range communication methods such as, for example, and without limitation, Bluetooth, BLE, wi-fi, NFC, or the like. For example, the communication circuit 423 may be included in the receiver integrated circuit (RxIC).

According to various embodiments, when a signal or power transmitted from the power transmission device 401 is received through a coil 421L, the power reception device 402 may control the communication circuit 423 to generate device information and power information of the power reception device 402 which are to be transmitted to the power transmission device 401. The generated power information may be transferred to the power transmission device 401 through the coil 421L. The generated power information may be transferred to the power transmission device 401 through a separate antenna. For example, the power information may be information related to charging power for the power reception device 402 (for example, a received power, voltage, or current state), or may include output power information, output voltage information, or charging current information of the power transmission device 401 or information associated therewith. For example, the power information may include information requesting a change in transmission power of the power transmission device 401.

According to various embodiments, the power reception device 402 may charge the battery 421e through a charging circuit (e.g., the charging circuit 210 in FIG. 2) using power received from the power transmission device 401 through the power reception circuit 421. When a magnetic field is formed in a coil (e.g., the transmission coil (Tx coil) 411L) of the power transmission device 401, a current flows along a coil (e.g., the reception coil (Rx coil) 421L) of the power reception device 402 by electromagnetic induction or resonance, and the battery 421e may be charged through the charging circuit using the current.

According to various embodiments, the detachment sensing module 426 may include various circuitry and sense that the power reception device 402 is detached from the power transmission device 401. For example, the detachment sensing module 426 may include at least one of a hardware detachment sensing circuit or a software detachment sensing algorithm. For example, even when the detachment sensing circuit is not included in a manufacturing process, the power reception device 402 may perform updating regarding a detachment sensing function through software updating to use the detachment sensing module 426.

According to various embodiments, the detachment sensing module 426 may sense a discovery signal or received power from the power transmission device 401, thereby sensing the power transmission device 401. The detachment sensing module 426 may sense a signal change of an input/output terminal of the rectification circuit 421b, the coil 421L, or the matching circuit 421a using a coil 421L signal generated by a signal output from the power transmission device 401. The detachment sensing module 426 may acquire information about the movement of the power reception device 402. The detachment sensing module 426 may acquire information on a temperature from at least one sensor 424 (e.g., a temperature sensor, a heart rate monitor (HRM) sensor, etc.). For example, the detachment sensing module 426 may be included in the receiver integrated circuit (RxIC).

According to various embodiments, the display 425 may display various types of display information necessary for wireless power transmission/reception.

According to various embodiments, the at least one sensor 424 may include at least some of a current/voltage sensor, a temperature sensor, an illumination sensor, or a sound sensor. The temperature sensor may measure the temperature of the battery 421e.

According to various embodiments, the processor 422 may determine charging control based on a change in the temperature of the inside of the power reception device 402 or the temperature of the battery 421e, measured by the temperature sensor, depending on a time.

According to various embodiments, the processor 422 may perform overall control of the power reception device 402, may generate various types of messages necessary for wireless power transmission, and may transfer the messages to the communication circuit 423.

According to various embodiments, the processor 422 may control the device to charge the battery 421e through a charging circuit (e.g., the charging circuit 210 in FIG. 2) using power received from the power transmission device 401 through the power reception circuit 421. The processor 422 may determine, while charging the battery 421e, situation information related to an operation of charging the battery 421e. For example, the situation information related to the operation of charging the battery 421e may include at least one among information about a fully-charged state of the battery 421e based on the capacity of the battery 421e, information about whether the battery 421e is abnormal, for example, a swelling state, or information about the heat generation state of the power reception device 402.

According to various embodiments, the processor 422 may control the device to transmit, based at least partially on the situation information about the operation of charging the battery 421e, a signal corresponding to power output stopping to the power transmission device 401 such that the power transmission device 401 stops the operation of wirelessly outputting power. For example, when it is determined that the power reception device 402 is in at least one of a fully charged state or a state of a designated temperature or higher, the processor 422 may perform control to transmit a signal corresponding to power output stopping to the power transmission device 401 such that the power transmission device 401 stops the operation of wirelessly outputting power.

According to various embodiments, the processor 422 may control the power reception circuit 421 to not receive power wirelessly output by the power transmission device 401, or may control at least some (for example, the communication circuit 423, the power reception circuit 421, etc.) of inner elements of the power reception device 402 to not respond to a signal received from the power transmission device 401. For example, the processor 422 may be included in the receiver integrated circuit (RxIC).

According to various embodiments, the processor 422 may determine whether at least one of a signal for charging resumption or a signal related to the detachment state of the power transmission device 401 is sensed in a state in which power output of the power transmission device 401 is stopped. For example, when the remaining capacity of the battery 412e, measured after a predetermined time elapses in the fully charged state of the battery 412e, is less than a predefined value or when the temperature of the battery 412e is lower than a predefined value, the processor 422 may determine that the signal for charging resumption has been sensed. However, the determination is not limited thereto.

According to various embodiments, in a state in which the power output of the power transmission device 401 is stopped, the processor 422 may determine whether it is possible for the power reception device to be positioned adjacent to the power transmission device 401 and receive power from the power transmission device 401 (for example, may receive a signal (e.g., a ping) related to the detachment state), may determine a charging resumption condition of the battery 412e, and when the charging resumption condition is satisfied (for example, when the remaining capacity of the battery 412e, measured after a predetermined time elapses, is less than a predefined value or when the temperature of the battery 412e is lower than a predefined value), may perform control such that the battery 412e is charged through the charging circuit 210.

According to various embodiments, based on at least one of a signal for resumption of charging of the battery 412e or a signal related to a state of detachment of the power reception device 402 from the power transmission device 401, the processor 422 may transmit a signal corresponding to power output resumption to the power transmission device 401 such that the power transmission device 401 resumes the operation of wirelessly outputting power. In an embodiment, in response to the transmitting of the signal corresponding to power output resumption, the processor 422 may receive power transmitted from the power transmission device 401.

According to various embodiments, the processor 422 may perform, based on at least one of the signal for resumption of charging of the battery 412e or whether the power reception device 402 is detached from the power transmission device 401, control to respond to a signal or power from the power transmission device 401 such that the power transmission device 401 resumes the operation of wirelessly outputting power.

According to various embodiments, when the detachment of the power transmission device 401 is sensed through the detachment sensing module 426, the processor 422 may receive a signal regarding the state of the detachment sensing module 426 from the power reception circuit 421. For example, the signal regarding the state of the detachment sensing module 426 may include a signal indicating that the detachment sensing module 426 switches from a low state (e.g., an attached state) to a high state (e.g., a state in which the power reception device 402 is detached from the power transmission device 401).

According to various embodiments, the processor 422 may transmit a signal corresponding to disabling of the power reception circuit 421 to the power reception circuit 421 based on the situation information related to the operation of charging the battery 412e. An operation for disabling the power reception circuit 421 may include an operation for performing control such that a response signal responding to the determination signal for determining the power reception device 402, received from the power transmission device 401, is not transmitted to the power transmission device 401.

According to various embodiments, the processor 422 may transmit a signal corresponding to enabling of the power reception circuit 421 to the power reception circuit 421 at least based on the signal for resumption of charging of the battery 412e or the signal related to the detachment state of the power transmission device 401. An operation for enabling the power reception circuit 421 may include an operation of transmitting, to the power transmission device 401, a response signal responding to a power signal received from the power transmission device 401.

Figure 5:
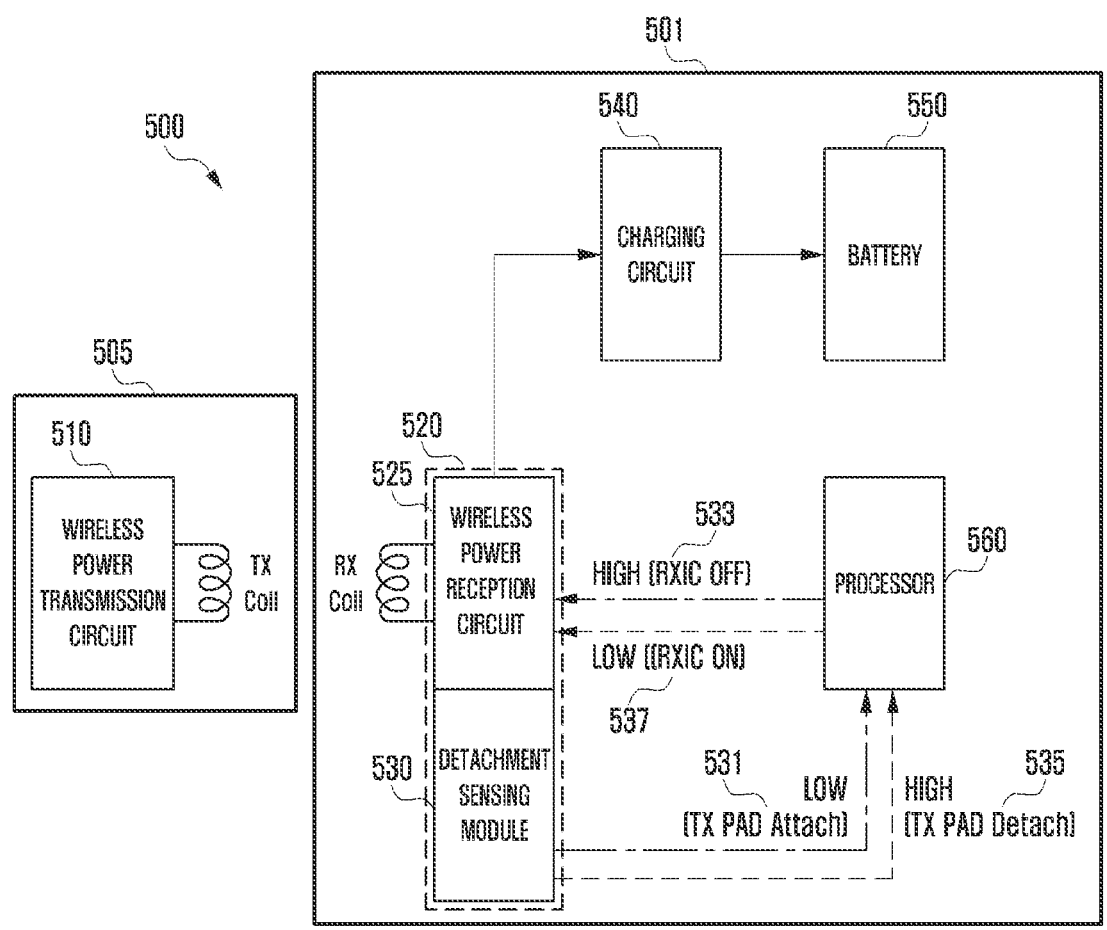
FIG. 5 is a diagram illustrating an example signal flow during wireless charging of an electronic device according to various embodiments.

FIG. 5 is a diagram illustrating example signal flow during wireless charging of an electronic device according to various embodiments.

According to various embodiments, referring to FIG. 5, when attachment of an electronic device 501 (e.g., the electronic device 402 in FIG. 4B) to a charging device 505 (e.g., the external electronic device 401 in FIG. 4A) is sensed, the charging device 505 may wirelessly provide power to the electronic device 501. For example, when a signal generated in a wireless power transmission circuit 510 (e.g., the power transmission circuit 411 in FIG. 4A) of the charging device 505 is applied to a transmission coil (e.g., Tx coil) (e.g., the transmission coil 411L in FIG. 4A), an electromagnetic field may be formed around the transmission coil, and power generated by the electromagnetic field may be transmitted to a wireless power reception circuit 525 (e.g., the power reception circuit 421 in FIG. 4B) included in a reception circuit 520 of the electronic device 501.

According to various embodiments, the wireless power reception circuit 525 may receive power transmitted from the charging device 505, and may transfer the power to a charging circuit 540 (e.g., the charging circuit 210 in FIG. 2).

According to various embodiments, when power is applied to the wireless power reception circuit 525, the battery 550 (e.g., the battery 412e in FIG. 4B) may be supplied (or charged) with the power transmitted from the charging device 505.

According to various embodiments, a processor 560 may include various processing circuitry and determine, while charging the battery 550, situation information related to an operation of charging the battery 550. For example, the processor 560 may determine, without limitation, at least one among information about the swelling state of the battery 550, information about the fully charged state thereof, or information about the heat generation state of the electronic device 501. When it is determined, based on the at least one among the information about the swelling state of the battery 550, the information about the fully charged state thereof, or the information about the heat generation state of the electronic device 501, that the battery 550 is swelled, fully charged, or heated, the processor 560 may transmit a signal corresponding to power transmission stopping to the charging device 505 through the wireless power reception circuit 525 such that the charging device 505 stops the operation of wireless transmitting power.

According to various embodiments, in a state in which power transmission is stopped, the processor 560 may identify at least one of a signal for charging resumption or whether the electronic device 501 is detached from the charging device 505. For example, the signal for charging resumption may include the case in which the remaining capacity of the battery 550, measured after a predetermined time elapses in the fully charged state of the battery, is less than a predefined value or the case in which a temperature measured by a sensor circuit (e.g., the at least one sensor 424 in FIG. 4B) is lower than a predefined value.

According to various embodiments, the processor 560 may transmit, based on whether the power reception or the signal for charging resumption is sensed, a signal 533 for controlling the wireless power reception circuit 525 to be in a high state, for example, a signal for controlling the wireless power reception circuit 525 to be turned off (e.g., disabled), or a signal 537 for controlling the wireless power reception circuit 525 to be in a low state, for example, a signal for controlling the wireless power reception circuit 525 to be turned on (e.g., enabled) to the wireless power reception circuit 525. When the wireless power reception circuit 525 is turned off and then turned on in response to the received signals 533 and 537, the wireless power reception circuit 525 may transmit, to the charging device 505, a response signal that responds to a signal (e.g., a ping signal) for detecting a wireless power reception device, received from the wireless power transmission circuit 510 of the charging device 505.

According to various embodiments, in response to the transmission of the response signal, the wireless power reception circuit 525 may receive power from the wireless power transmission circuit 510 of the charging device 505, and may charge the battery 550 through the charging circuit 540 using the received wireless power.

According to various embodiments, based on whether the power reception or the signal for charging resumption is sensed, the processor 560 may transmit, to the reception circuit 520, the signal 533 for controlling the reception circuit 520, for example, the wireless power reception circuit 525, a communication circuit (e.g., the communication circuit 423 in FIG. 4B), or a reception coil (Rx coil) connection part of the reception circuit 520 to be turned off (e.g., disabled) or the signal 537 for controlling the same to be turned on (e.g., enabled).

According to various embodiments, a detachment sensing module 530 may include various circuitry and sense whether the electronic device 501 is detached from the charging device 505. For example, when detachment of the electronic device 501 from the charging device 505 is sensed, the processor 560 may receive state information of the detachment sensing module 530, for example, a high signal 535, from the detachment sensing module 530. When attachment of the electronic device to the charging device 505 is sensed, the processor 560 may receive state information of the detachment sensing module 530, for example, a low signal 531, from the detachment sensing module 530.

According to various embodiments, the detachment sensing module 530 may be included in the reception circuit 520. Further, the detachment sensing module 530 may be integrated, as one element, with the wireless power reception circuit 525, or may be distinguished as a separate element.

According to various embodiments, after the electronic device 501 is detached, when a response signal is not received from the electronic device 501 within a predetermined number of times, the charging device 505 may control the charging device 505 to be in a default state.

According to various embodiments, when the detachment sensing module 530 is a hardware circuit, the detachment sensing module 530 may be separately configured under control of the processor 560 so as not to be in a turned-off state (e.g., a disabled state). Thus, even when the wireless power reception circuit 525 of the reception circuit 520 is in a turned-off state, the detachment sensing module 530 may be in turned-on state.

Figure 6:
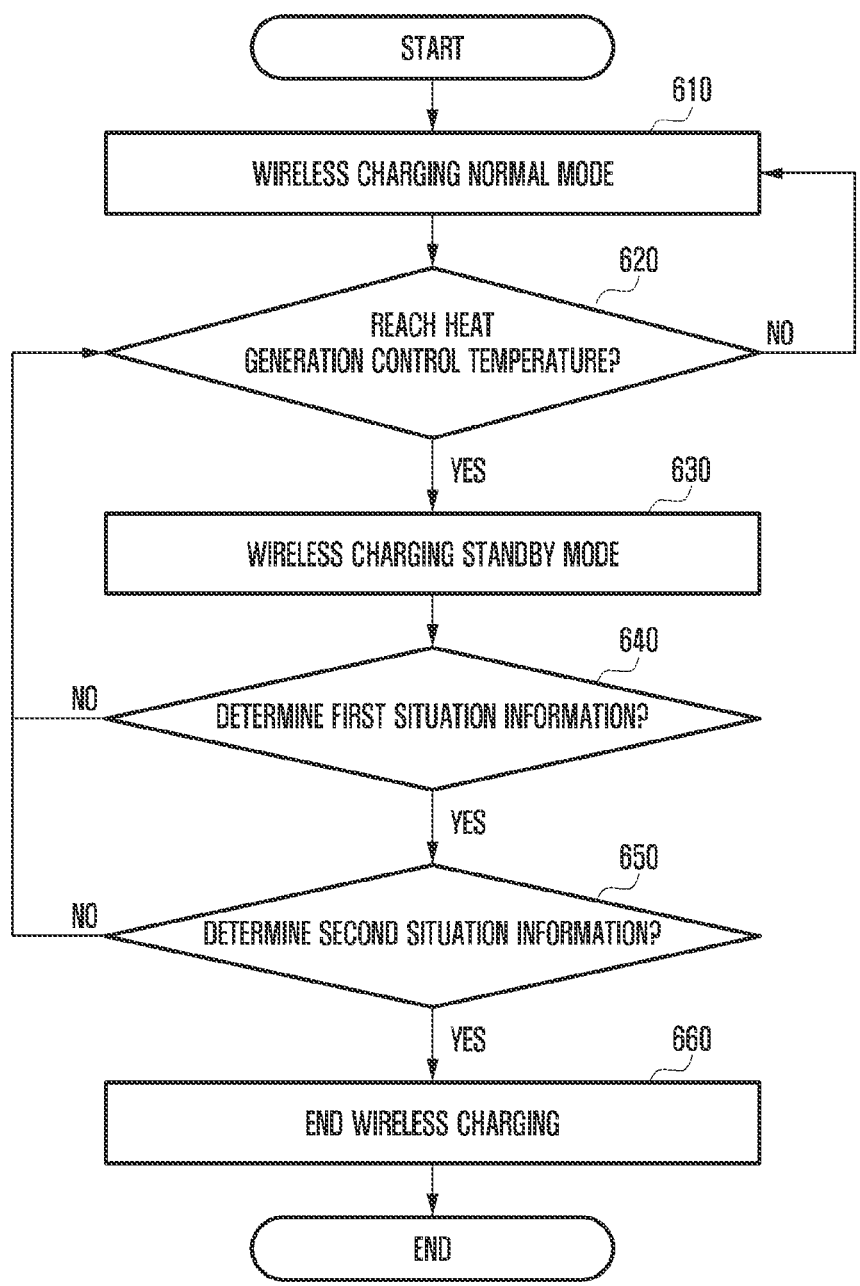
FIG. 6 is a flowchart illustrating an example method for determining, based on situation information of an electronic device detachment of the electronic device from an external electronic device, and ending wireless charging according to various embodiments.

FIG. 6 is a flowchart illustrating an example method for determining, based on situation information of an electronic device, detachment of the electronic device from an external electronic device, and ending wireless charging according to various embodiments.

According to various embodiments, in an electronic device which does not separately include a circuit (e.g., a detachment sensing circuit) configured to sense a ping signal, it is difficult to use a wireless charging solution for improvement of heat generation. For example, when the electronic device 101 enters a wireless charging standby mode (power hold mode (PHM)), the electronic device 101 may determine, through a detachment sensing circuit, whether the electronic device 101 is attached to the external electronic device 102. In the wireless charging standby mode, the external electronic device 102 may switch to a standby state to transmit a ping signal in a predetermined period, and the electronic device 101 may change the state of a wireless power reception circuit to a disabled state. A wireless charging operation, in which even when the electronic device 101 is attached to the external electronic device 102, the external electronic device 102 does not transmit power and transfers a predetermined signal for wireless charging resumption or whether the electronic device 101 is detached, may refer, for example, to a wireless charging standby mode. The electronic device 101 may determine whether the electronic device 101 is detached from the external electronic device 102, based on sensing a ping signal of the external electronic device 102 through the detachment sensing circuit rather than the wireless power reception circuit, and may display a charging control and a user interface (UI), which correspond to each situation. If the electronic device 101 does not separately include the detachment sensing circuit, when the reception circuit (RxIC) itself switches to a disabled state in the wireless charging standby mode, it may be possible to incorrectly display a user interface indicating that the electronic device 101 is continuously being charged despite being detached from the external electronic device 102.

According to various embodiments, referring to FIG. 6, if the electronic device 101 does not separately include the detachment sensing circuit, even when the electronic device 101 operates in the wireless charging standby mode, the electronic device 101 may determine whether the electronic device 101 is detached from the external electronic device 102.

According to various embodiments, in operation 610, the electronic device 101 may operate in a wireless charging normal mode. For example, a processor (e.g., the processor 422 in FIG. 4B) of the electronic device 101 may charge a battery (e.g., the battery 550 in FIG. 5) through a charging circuit (e.g., the charging circuit 540 in FIG. 5) using power wirelessly received from an external electronic device (e.g., the external electronic device 401 in FIG. 4A).

According to various embodiments, in operation 620, the electronic device 101 may determine whether the electronic device 101 reaches a heat generation control temperature. Herein, the determining of whether the electronic device 101 reaches the heat generation control temperature may simply correspond to an embodiment for operating in a wireless charging standby mode. The electronic device 101 may determine, in addition to a temperature condition, at least one piece of information related to charging of the electronic device 101 and may perform control so as to operate in the wireless charging standby mode. For example, the at least one piece of information related to charging may include, based on the capacity of a battery, information related to a fully-charged state of the battery, information related to whether the battery is abnormal, for example, a swelling state, or the like.

According to various embodiments, when it is determined in operation 620 that the electronic device 101 does not reach the heat generation control temperature, the electronic device 101 may return to operation 610 to continuously operate in the wireless charging normal mode.

According to various embodiments, when it is determined in operation 620 that the electronic device 101 reaches the heat generation control temperature, the electronic device 101 may move to operation 630 to operate in the wireless charging standby mode. For example, the electronic device 101 may transmit a designated signal corresponding to power output stopping to the external electronic device 102 such that the external electronic device 102 stops an operation of outputting power. When at least one of a swelling state of the battery, a fully charged state thereof, or a heat generation state of the electronic device is sensed, the electronic device 101 may transmit a signal corresponding to power output stopping to the external electronic device 102 such that the external electronic device 102 stops an operation of wirelessly outputting power.

According to various embodiments, the electronic device 101 may use a detachment sensing module (e.g., software) to sense whether the electronic device 101 is detached from the external electronic device 102 in the wireless charging standby mode. For example, if the electronic device 101 corresponds to both first situation information and second situation information, it may be determined that the electronic device 101 is detached from the external electronic device 101.

According to various embodiments, in operation 640, the electronic device 101 may determine whether the electronic device 101 corresponds to the first situation information. For example, the first situation information may include whether movement of the electronic device 101 has occurred. For example, the detachment sensing module may sense movement of the electronic device 101 using an acceleration sensor or the like thereof, and if the movement has occurred, may determine that the electronic device 101 corresponds to the first situation information.

According to various embodiments, when it is determined in operation 640 that the electronic device 101 does not correspond to the first situation information, the electronic device 101 may return to operation 620 to determine again whether the electronic device 101 has reached the heat generation control temperature.

According to various embodiments, when it is determined in operation 640 that the electronic device 101 corresponds to the first situation information, the electronic device 101 may move to operation 650 to determine whether the electronic device 101 corresponds to the second situation information. For example, the second situation information may include information about whether a rectified voltage (Vrect) of the electronic device 101 belongs to a normal range. For example, if the rectified voltage of the electronic device 101 deviates from a normal range, the detachment sensing module may determine that the electronic device 101 corresponds to the second situation information.

According to various embodiments, when it is determined in operation 650 that the electronic device 101 does not correspond to the second situation information, the electronic device 101 may return to operation 620 to determine again whether the electronic device 101 has reached the heat generation control temperature.

According to various embodiments, when it is determined in operation 650 that the electronic device 101 corresponds to the second situation information, the electronic device 101 may move to operation 660 to determine that the electronic device 101 is detached from the external electronic device 102, and end wireless charging.

According to various embodiments, in operation 650, in consideration of additional information in addition to the first situation information and the second situation information, the electronic device 101 may determine that the electronic device 101 is detached from the external electronic device 102. (Of course, it may be determined, based on the first situation information and the second situation information, that the electronic device 101 is detached from the external electronic device 102.) For example, the additional information may include at least one of HRM sensor information, received-power information, or temperature information. For example, if a predetermined value cannot be read from an HRM sensor of the electronic device 101, the detachment sensing module may use the same as the additional information. In another example, if received power of the electronic device 101 is below a minimum operation range, the detachment sensing module may use the same as the additional information. In another example, if a value obtained from a temperature sensor of the electronic device 101 is less than a specific temperature, the detachment sensing module may use the same as the additional information.

According to various embodiments, referring to FIG. 6, when movement (e.g., movement alert) of the electronic device 101 occurs and the rectified voltage is normally generated, the electronic device 101 may enter the wireless charging standby mode again if the condition of the wireless charging standby mode is satisfied.

According to various embodiments, referring to FIG. 6, when movement (e.g., movement alert) of the electronic device 101 occurs and the rectified voltage is not normally generated, the electronic device 101 may determine that the electronic device 101 has been detached from the external electronic device 102.

According to various embodiments, referring to FIG. 6, when a movement (e.g., movement alert) of the electronic device 101 occurs, the rectified voltage is not normally generated, and the received power falls below a normal range, the electronic device 101 may determine that the electronic device 101 has been detached from the external electronic device 102.

According to various embodiments, referring to FIG. 6, when a movement of the electronic device 101 (e.g., movement alert) occurs, the rectified voltage is not normally generated, and the sensed temperature falls below a reference temperature, the electronic device 101 may determine that the electronic device 101 has been detached from the external electronic device 102.

According to various embodiments, referring to FIG. 6, when a movement of the electronic device 101 (e.g., movement alert) occurs, the rectified voltage is not normally generated, and a value cannot be read from the HRM sensor (e.g., HRM sensor interrupt release), the electronic device 101 may determine that the electronic device 101 has been detached from the external electronic device 102.

Figure 7:
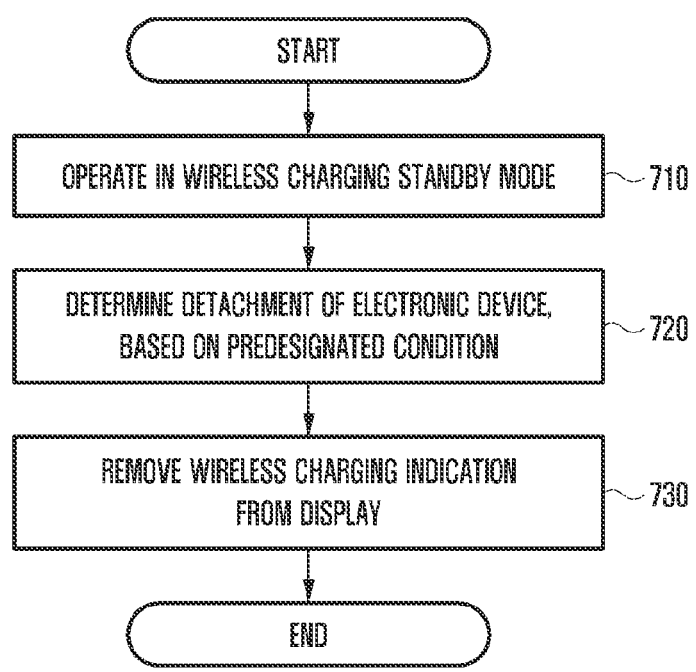
FIG. 7 is a flowchart illustrating an example method for determining detachment of an electronic device from an external electronic device based on a predesignated condition during a wireless charging standby mode operation of the electronic device, and displaying, to a user, that wireless charging has been ended according to various embodiments.

FIG. 7 is a flowchart illustrating an example method for determining detachment of an electronic device from an external electronic device based on a predesignated condition during a wireless charging standby mode operation of the electronic device, and displaying, to user, that wireless charging has been ended according to various embodiments.

According to various embodiments, in operation 710, the electronic device 101 may operate in a wireless charging standby mode. For example, the electronic device 101 may transmit a designated signal corresponding to power output stopping to the external electronic device 102 such that the external electronic device 102 stops an operation of outputting power. When at least one of a swelling state of a battery, a fully charged state thereof, or a heat generation state of the electronic device is sensed, the electronic device 101 may transmit a signal corresponding to power output stopping to the external electronic device 102 such that the external electronic device 102 stops an operation of wirelessly outputting power.

According to various embodiments, in operation 720, the electronic device 101 may determine, based on a predesignated condition, that the electronic device 101 is detached from the external electronic device 102. For example, the predesignated condition may include, for example, and without limitation, at least one among whether movement of the electronic device 101 has occurred, whether a rectified voltage (Vrect) falls within a normal range, whether a predetermined value can be read from an HRM sensor (e.g., whether there is an object on the surface of the sensor), whether received power is below the minimum operation range (e.g., whether induced received power is not present), whether a value obtained from a temperature sensor is less than a specific temperature (e.g., the specific temperature can be configured as a temperature lower than a temperature at which the wireless charging standby mode is released), or the like.

According to various embodiments, in operation 720, the electronic device 101 may divide the predesignated condition into multiple steps. For example, the electronic device 101 may determine, as a first condition, at least one of whether movement of the electronic device 101 has occurred or whether the rectified voltage (Vrect) belongs to a normal range. Then, the electronic device 101 may determine, as a second condition, at least one among whether a predetermined value can be read from the HRM sensor of the electronic device 101, whether received power is below a minimum operating range, or whether a value obtained from the temperature sensor is less than a specific temperature. When the first condition and the second condition are satisfied, the electronic device 101 may determine that the electronic device 101 is detached from the external electronic device 102.

According to various embodiments, in operation 720, the electronic device 101 may consider, as the predesignated condition, whether near field communication (NFC) is stopped. A second communication circuit (e.g., reference numeral 423b in FIG. 4B) of the electronic device 101 and a second communication circuit (e.g., reference numeral 413b in FIG. 4A) of the external electronic device 102 may perform NFC. The electronic device 101 may transmit, to the external electronic device 102, a command to switch to a wireless charging standby mode while transmitting a command to activate NFC of the external electronic device 102. If the NFC between the electronic device 101 and the external electronic device 102 is disconnected in the wireless charging standby mode, the electronic device 101 may determine that the electronic device 101 has been detached from the external electronic device 102.

According to various embodiments, in operation 730, the electronic device 101 may remove, from a display, an indication that the electronic device 101 is being wirelessly charged. The electronic device 101 may determine, through operation 720, whether the electronic device 101 is detached from the external electronic device 102, and thus, when the electronic device 101 is detached from the external electronic device 102, the electronic device 101 may remove, from the display, an indication that the electronic device 101 is being charged. Therefore, it is possible to prevent and/or reduce occurrences of the case of indicating that the electronic device 101 is continuously being charged.

According to various embodiments, in operation 730, the electronic device 101 may provide, to a user, at least one of voice guidance, a warning sound, or vibration indicating that the electronic device 101 has been detached from the external electronic device 102, in addition to providing a user interface through the display.

An electronic device according to various example embodiments may include: a battery; a charging circuit; a wireless power reception circuit configured to acquire transmission power wirelessly output from an external electronic device; and a processor, wherein the processor is configured to control the electronic device to: charge the battery through the charging circuit using received power acquired through the wireless power reception circuit; determine at least one piece of information related to the charging while the charging is performed; transmit, based at least partially on the at least one piece of information, a designated signal corresponding to stopping of the transmission power to the external electronic device such that the external electronic device enters a wireless charging standby mode in which the external electronic device holds outputting the transmission power; determine first situation information about the electronic device during the wireless charging standby mode; determine second situation information about the electronic device in response to the determining of the first situation information; and based on the electronic device corresponding to the first situation information and the second situation information, sense that the electronic device is detached from the external electronic device.

The electronic device according to various example embodiments may further include a display, and the processor may control displaying, through the display, that the charging has been ended, in response to sensing of the detachment.

The electronic device according to various example embodiments may further include an output module comprising various output circuitry, and the processor may control outputting at least one of a sound or a vibration, indicating that the charging has been ended, through the output module in response to sensing of the detachment.

The electronic device according to various example embodiments may further include a display, and the processor may control the display to display information about the charging through the display while the charging is performed, and may remove the information about the charging, displayed on the display, in response to sensing the detachment.

The electronic device may not further include a physical circuit, other than the wireless power reception circuit, configured to sense whether the external electronic device is detached.

The processor according to various example embodiments may disable the wireless power reception circuit in the wireless charging standby mode.

The at least one piece of information related to the charging may include at least one of information about a swelling state of the battery, information about a fully charged state of the battery, or information about a heat generation state of the electronic device.

The first situation information may include information about occurrence of movement of the electronic device.

The second situation information may include information indicating that a rectified voltage (Vrect) does not correspond to a normal range.

The electronic device may further include an NFC module comprising NFC circuitry, and the processor may be configured to sense detachment between the electronic device and the external electronic device through the NFC module.

A method of operating an electronic device according to various example embodiments may include: charging a battery through a charging circuit using received power acquired through a wireless power reception circuit; determining at least one piece of information related to the charging while the charging is performed; transmitting, based at least partially on the at least one piece of information, a designated signal corresponding to stopping of the transmission power to an external electronic device such that the external electronic device enters a wireless charging standby mode in which the external electronic device holds outputting the transmission power; determining first situation information about the electronic device during the wireless charging standby mode; determining second situation information about the electronic device in response to the determining of the first situation information; and based on the electronic device corresponding to the first situation information and the second situation information, sensing that the electronic device has been detached from the external electronic device.

The method according to various example embodiments may include displaying a fact that the charging has been ended, through a display in response to sensing of the detachment.

The method according to various example embodiments may include outputting at least one of a sound or a vibration, indicating that the charging has been ended, through an output module in response to sensing of the detachment.

The method according to various example embodiments may include: displaying information about the charging through a display while the charging is performed; and removing the information about the charging, displayed on the display, in response to sensing of the detachment.

The electronic device may not further include a physical circuit, other than the wireless power reception circuit, configured to sense whether the external electronic device is detached.

The method according to various example embodiments may include disabling the wireless power reception circuit in the wireless charging standby mode.

The at least one piece of information related to the charging may include at least one of information about a swelling state of the battery, information about a fully charged state of the battery, or information about a heat generation state of the electronic device.

The first situation information may include information about occurrence of movement of the electronic device.

The second situation information may include information indicating that a rectified voltage (Vrect) of the electronic device does not correspond to a normal range.

The method according to various example embodiments may include an operation of sensing detachment between the electronic device and the external electronic device through an NFC module.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

The invention claimed is:

1. An electronic device comprising:
a display;
a battery;
a wireless power reception circuit configured to wirelessly receive power from an external electronic device through a coil; and
memory storing instructions that, when executed by a processor, cause the electronic device to:
charge the battery using power received through the wireless power reception circuit,
while charging the battery, control the display to display first information indicating that the battery is being charged, and identify second information related to a state of the battery, wherein the second information related to the state of the battery includes at least one of information about a swelling state of the battery, information about a fully charged state of the battery, or information about a temperature of the electronic device,
in response to identifying the second information related to the state of the battery, transmit a designated signal to the external electronic device such that the external electronic device activates a wireless charging standby mode in which the external electronic device holds transmission of the power and performs NFC communication with the electronic device,
while the external electronic device is in the wireless charging standby mode, identify that the electronic device is detached from the external electronic device based on:
first situation information regarding a movement of the electronic device,
second situation information indicating that a rectified voltage (Vrect) of the electronic device does not correspond to a normal range, and
third situation information indicating at least one of a state in which no value is detected from a heat rate monitor (HRM) sensor, a state in which the received power is below a first threshold, or a state in which the temperature of the electronic device is below a second threshold;
in response to identifying of detachment of the electronic device, control the display not to display the first information indicating that the battery is being charged,
wherein the instructions, when executed by the processor, cause the electronic device to:
while the external electronic device is in the wireless charging standby mode, identify that the NFC communication with the external electronic device is disconnected; and
in response to identifying that the NFC communication with the external electronic device is disconnected, control the display not to display the first information indicating that the battery is being charged.

2. The electronic device of claim 1, further comprising an output module comprising output circuitry,
wherein the instructions, when executed by the processor, cause the electronic device to control the output module, based on identifying detachment of the electronic device, to output at least one of a sound or a vibration, indicating that the charging has ended.

3. The electronic device of claim 1, wherein the instructions, when executed by the processor, cause the electronic device to disable the wireless power reception circuit while the external electronic device is in the wireless charging standby mode.

4. A method of operating an electronic device, the method comprising:
charging a battery using power received through a wireless power reception circuit;
while charging the battery, controlling a display to display first information indicating that the battery is being charged, and identify second information related to a state of the battery, wherein the second information related to the state of the battery includes at least one of information about a swelling state of the battery, information about a fully charged state of the battery, or information about a temperature of the electronic device;
in response to identifying the second information related to the state of the battery, transmitting a designated signal to an external electronic device such that the external electronic device activates a wireless charging standby mode in which the external electronic device holds transmission of the power and performs NFC communication with the electronic device;
while the external electronic device is in the wireless charging standby mode, identifying that the electronic device is detached from the external electronic device based on:
first situation information regarding a movement of the electronic device,
second situation information indicating that a rectified voltage (Vrect) of the electronic device does not correspond to a normal range, and
third situation information including at least one of a state in which no value is detected from a heat rate monitor (HRM) sensor, a state in which the received power is below a first threshold, or a state in which the temperature of the electronic device is below a second threshold;
in response to identifying of detachment of the electronic device, controlling the display not to display the first information indicating that the battery is being charged,
wherein the method of operating the electronic device further comprises:
while the external electronic device is in the wireless charging standby mode, identifying that the NFC communication with the external electronic device is disconnected; and
in response to identifying that the NFC communication with the external electronic device is disconnected, controlling the display not to display the first information indicating that the battery is being charged.

* * * * *